United States Patent
Wang

(10) Patent No.: US 11,231,836 B2
(45) Date of Patent: Jan. 25, 2022

(54) MULTI-WINDOW DISPLAYING APPARATUS AND METHOD AND MOBILE ELECTRONIC EQUIPMENT

(71) Applicant: Sony Mobile Communications, Inc., Tokyo (JP)

(72) Inventor: Guangyu Wang, Beijing (CN)

(73) Assignee: Sony Group Corporation, Tokyo (JP)

(*) Notice: Subject to any disclaimer, the term of this patent is extended or adjusted under 35 U.S.C. 154(b) by 0 days.

(21) Appl. No.: 16/346,549

(22) PCT Filed: Mar. 30, 2017

(86) PCT No.: PCT/CN2017/078704
§ 371 (c)(1),
(2) Date: May 1, 2019

(87) PCT Pub. No.: WO2018/176297
PCT Pub. Date: Oct. 4, 2018

(65) Prior Publication Data
US 2019/0258372 A1    Aug. 22, 2019

(51) Int. Cl.
*G06F 3/048* (2013.01)
*G06F 3/0482* (2013.01)
(Continued)

(52) U.S. Cl.
CPC ............ *G06F 3/0484* (2013.01); *G06F 3/048* (2013.01); *G06F 3/0482* (2013.01); *G06F 9/451* (2018.02)

(58) Field of Classification Search
CPC ........ G06F 3/048; G06F 3/0482; G06F 9/451; G06F 3/0484
See application file for complete search history.

(56) References Cited

U.S. PATENT DOCUMENTS

2011/0219312 A1* 9/2011 Kim .................... G06F 3/01
715/739
2011/0219332 A1* 9/2011 Park .................. H04M 1/72469
715/808
(Continued)

FOREIGN PATENT DOCUMENTS

| CN | 102760034 A | 10/2012 |
| CN | 103995722 A | 8/2014 |
| CN | 105912192 A | 8/2016 |

OTHER PUBLICATIONS

International Search Report and Written Opinion for PCT/CN2017/078704 dated Jan. 8, 2018.

*Primary Examiner* — Xuyang Xia
(74) *Attorney, Agent, or Firm* — Renner, Otto, Boisselle & Sklar, LLP

(57) ABSTRACT

A multi-window displaying apparatus and method and mobile electronic equipment. The method includes: mobile electronic equipment determines a second application from one or more applications and operates the second application in association with an operation by a user on a content of a first application after receiving the operation; wherein the second application makes a response to the operation on the first application, and the first application and the second application are displayed in a multi-window manner. Hence, the second application may associatedly be opened and multi-window display may be performed, with no need of frequent switching between multiple applications. Also, redundant operations on the second application may be reduced, thereby improving experiences of users.

14 Claims, 6 Drawing Sheets

(51) Int. Cl.
*G06F 3/0484* (2013.01)
*G06F 9/451* (2018.01)

(56) References Cited

U.S. PATENT DOCUMENTS

| | | | | |
|---|---|---|---|---|
| 2012/0064947 A1* | 3/2012 | Yi | ......................... | G06F 3/0483 |
| | | | | 455/566 |
| 2012/0144347 A1* | 6/2012 | Jo | ....................... | G06F 3/04817 |
| | | | | 715/863 |
| 2012/0262494 A1* | 10/2012 | Choi | .................... | G06F 3/0481 |
| | | | | 345/672 |
| 2013/0205219 A1* | 8/2013 | Moha | ...................... | H04L 67/00 |
| | | | | 715/748 |
| 2013/0290866 A1* | 10/2013 | Kim | ................... | G06F 3/04883 |
| | | | | 715/748 |
| 2015/0012842 A1* | 1/2015 | Kuscher | ................ | H04L 65/403 |
| | | | | 715/753 |
| 2015/0113455 A1 | 4/2015 | Kang et al. | | |
| 2016/0034440 A1* | 2/2016 | Lee | .......................... | G06F 3/14 |
| | | | | 715/728 |
| 2016/0209987 A1* | 7/2016 | Kaufthal | ................ | G06F 3/0485 |
| 2018/0188924 A1* | 7/2018 | Kumar | .................... | G06N 5/04 |

\* cited by examiner

MULTI-WINDOW DISPLAYING APPARATUS AND METHOD AND MOBILE ELECTRONIC EQUIPMENT

RELATED APPLICATIONS

This application is a national phase entry of International Application No. PCT/CN2017/078704 filed on Mar. 30, 2017 and published in the English language, which is hereby incorporated by reference in its entirety.

TECHNICAL FIELD

This disclosure relates to the field of mobile equipment technologies, and in particular to a multi-window displaying apparatus and method and mobile electronic equipment.

BACKGROUND

Mobile electronic equipment (such as smart mobile phones, and tablet PCs, etc.) has been widely used, and till now, various mobile operating systems, such as IOS, and Android, etc., have been developed in the mobile electronic equipment. Various application programs (or referred to as applications or APPs in brief) may operate in these mobile operating systems, thereby achieving various powerful functions.

For example, various latest news may be read from BBC News, and various interesting contents may be shared with friends via Facebook.

It should be appreciated that the above description of the background is merely provided for clear and complete explanation of this disclosure and for easy understanding by those skilled in the art. It should not be understood that the above technical solution is known to those skilled in the art as it is described in the background of this disclosure.

SUMMARY

However, it was found by the inventor that single-window display is usually used in current mobile electronic equipment. For example, when an application (such as BBC News) is opened, the application will occupy the whole display screen of the mobile electronic equipment, and other opened applications (such as Facebook) will not be displayed on the display screen and operate at the background. When multiple time of associated operations (such as copy and paste) between two applications are needed to be performed, the two applications need to be switched frequently, which makes the user tedious and inconvenient.

Furthermore, even though some existing mobile operating systems support multi-window display, for example, two applications may be displayed on a display screen in an arranged or stacked manner, there exists no association, interaction or connection (sometimes collectively referred to below as "association") between the two applications, and opening or operating is independent of each other; hence, when a user needs to perform associated operations between the two applications, the user needs still to operate in a second application, with no user experience being improved.

Embodiments of this disclosure provide a multi-window displaying apparatus and method and mobile electronic equipment. In which, after the mobile electronic equipment receives an operation on a content of a first application by a user, it may determine a second application from one or more applications according to input of the user, and operate the second application in association with the operation; wherein the second application makes a response to the operation on the first application, and the first application and the second application are displayed in a multi-window manner; hence, user experiences may be improved.

According to a first aspect of this disclosure, there is provided a multi-window displaying method, applicable to mobile electronic equipment, the displaying method including:

receiving an operation on a content of a first application by a user;

displaying a list of one or more applications corresponding to the operation according to the operation;

determining a second application from the one or more applications according to input of the user; and operating the second application in association with the operation; wherein the second application makes a response to the operation on the first application, and the first application and the second application are displayed in a multi-window manner.

In an embodiment, the operation on the content of the first application includes any one or more of the following: duplicating a part of the content of the first application, sharing a part of the content of the first application, transmitting a part of the content of the first application, and operating a part of the content of the first application.

In an embodiment, the part of the content includes any one or more of the following forms: a word, a picture, a file, and program.

In an embodiment, the operating the second application in association with the operation includes: determining that the second application is opened in a second window different from a first window of the first application; and applying the operation to the second application associatedly and making a response to the operation on the first application by the second application.

In an embodiment, the applying the operation to the second application associatedly and making a response to the operation on the first application by the second application, includes: duplicating a word or picture of the first application to a display region of the second application; or, sharing a word or picture of the first application to an editing region of the second application; or, transmitting a file of the first application to the display region of the second application; or, operating a program of the first application in an executing region of the second application; or, operating the second application based on a content of the first application.

In an embodiment, the first application and the second application being displayed in a multi-window manner includes: the first application and second application being arranged on a display screen of the mobile electronic equipment; or, the first application and second application being stacked on a display screen of the mobile electronic equipment.

According to another aspect of this disclosure, there is provided a multi-window displaying apparatus, configured in mobile electronic equipment, the displaying apparatus including:

an operation receiving unit configured to receive an operation on a content of a first application by a user;

a list displaying unit configured to display a list of one or more applications corresponding to the operation according to the operation;

an application determining unit configured to determine a second application from the one or more applications according to input of the user; and an application operating unit configured to operate the second application in association with the operation;

wherein the second application makes a response to the operation on the first application, and the first application and the second application are displayed in a multi-window manner.

According to a further aspect of this disclosure, there is provided mobile electronic equipment, including a memory and a processor, the memory storing instructions executed by the processor, and the processor being configured to perform following control by executing the instructions:

receiving an operation on a content of a first application by a user;

displaying a list of one or more applications corresponding to the operation according to the operation;

determining a second application from the one or more applications according to input of the user; and operating the second application in association with the operation; wherein the second application makes a response to the operation on the first application, and the first application and the second application are displayed in a multi-window manner.

In an embodiment, the operation on the content of the first application includes any one or more of the following: duplicating a part of the content of the first application, sharing a part of the content of the first application, transmitting a part of the content of the first application, and operating a part of the content of the first application.

In an embodiment, the part of the content includes any one or more of the following forms: a word, a picture, a file, and program.

In an embodiment, the processor is configured to perform following control by executing the instructions: determining that the second application is opened in a second window different from a first window of the first application; and applying the operation to the second application associatedly, and making a response to the operation on the first application by the second application.

In an embodiment, the processor is configured to perform following control by executing the instructions: duplicating a word or picture of the first application to a display region of the second application; or, sharing a word or picture of the first application to an editing region of the second application; or, transmitting a file of the first application to the display region of the second application; or, operating a program of the first application in an executing region of the second application; or, operating the second application based on a content of the first application.

In an embodiment, the first application and the second application being displayed in a multi-window manner includes: the first application and second application being arranged on a display screen of the mobile electronic equipment; or, the first application and second application being stacked on a display screen of the mobile electronic equipment.

As an example, an advantage of embodiments of this disclosure exists in that after the mobile electronic equipment receives an operation on a content of a first application by a user, it may determine a second application from one or more applications according to input of the user, and operate the second application in association with the operation; wherein the second application makes a response to the operation on the first application, and the first application and the second application are displayed in a multi-window manner. Hence, the second application may associatedly be opened and multi-window display may be performed, with no need of frequent switching between multiple applications. Redundant operations on the second application may be reduced, thereby improving experiences of users.

With reference to the following description and drawings, embodiments of this disclosure are disclosed in detail, and principles of this disclosure and the manners of use are indicated. It should be understood that the scope of the embodiments of this disclosure is not limited thereto. The embodiments of this disclosure include many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprise/include" when used in this specification is taken to specify the presence of stated features, integers, steps or components but does not preclude the presence or addition of one or more other features, integers, steps, components or groups thereof.

BRIEF DESCRIPTION OF THE DRAWINGS

Elements and features depicted in one drawing or embodiment of the disclosure may be combined with elements and features depicted in one or more additional drawings or embodiments. Moreover, in the drawings, like reference numerals designate corresponding parts throughout the several views and may be used to designate like or similar parts in more than one embodiment.

DETAILED DESCRIPTION

Figure 1:
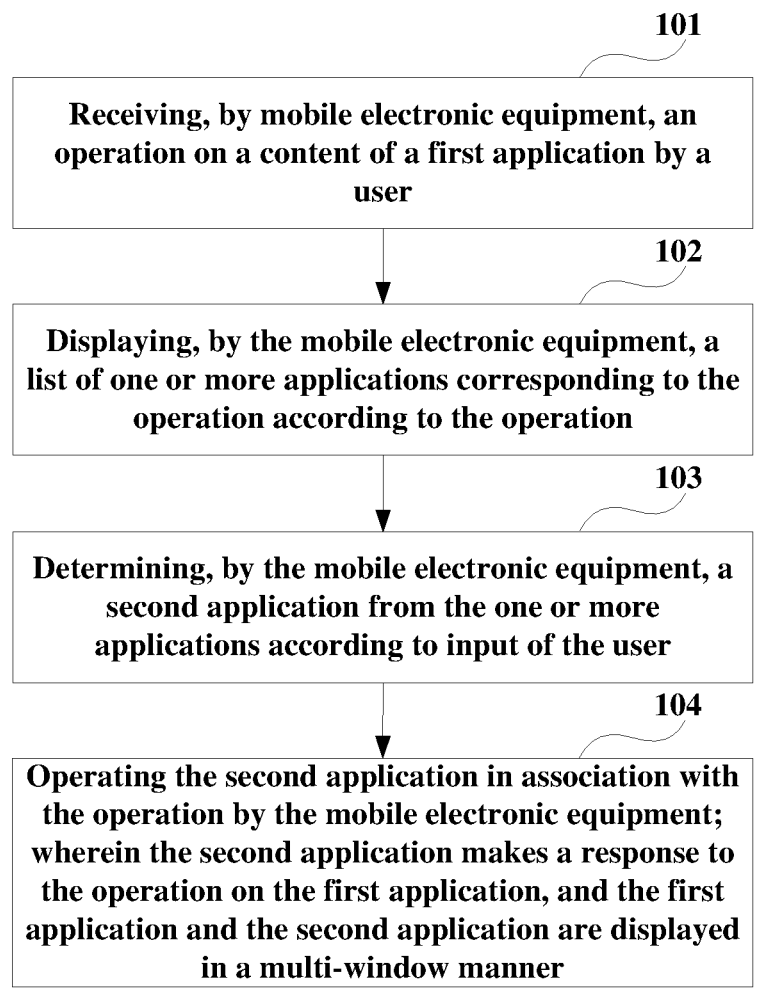
FIG. 1 is a flowchart of the multi-window displaying method of an embodiment of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the spirit and terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except as may be specified otherwise. Furthermore, the term "according to" should be understood as "at least partially according to", the term "based on" should be understood as "at least partially based on", except as may be specified otherwise.

The interchangeable terms "electronic equipment" and "electronic device" may include portable radio communication equipment. The term "portable radio communication equipment", which hereinafter is referred to as a "mobile radio terminal", "portable electronic device", or "portable communication device", includes all apparatuses such as mobile telephones, pagers, communicators, electronic organizers, personal digital assistants (PDAs), smart phones, media players, tablet PCs, portable communication devices, portable game devices, or the like.

The term "unit" may have conventional meaning in the field of electronics, electrical devices and/or electronic devices may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In the present application, embodiments of the disclosure are described primarily in the context of a portable electronic device in the form of a mobile telephone (also referred to as "mobile phone"). However, it shall be appreciated that the disclosure is not limited to the context of a mobile telephone and may relate to any type of appropriate electronic apparatus, examples of such type of electronic apparatus including a smart mobile phone, a tablet PC, a portable digital camera, a media player, a portable game device, a PDA, a computer, or the like.

Embodiment of the First Aspect

An embodiment of this disclosure provides a multi-window displaying method, applicable to mobile electronic equipment.

FIG. 1 is a flowchart of the multi-window displaying method of the embodiment of this disclosure. As shown in FIG. 1, the displaying method includes:

Step 101: receiving, by the mobile electronic equipment, an operation on a content of a first application by a user;

Step 102: displaying, by the mobile electronic equipment, a list of one or more applications corresponding to the operation according to the operation;

Step 103: determining, by the mobile electronic equipment, a second application from the one or more applications according to input of the user; and Step 104: operating the second application in association with the operation by the mobile electronic equipment; wherein the second application makes a response to the operation on the first application, and the first application and the second application are displayed in a multi-window manner.

In an embodiment, the mobile electronic equipment may operate a mobile operating system, such as IOS or Andoid, etc., and one or more applications may operate in the mobile operating system; however, this disclosure is not limited thereto, and any mobile electronic equipment capable of operating multiple applications may be applicable to this disclosure.

The following description shall be given taking a smart mobile phone with an Android system as an example; however, this disclosure is not limited thereto.

In an embodiment, the applications may be various existing APPs, such as Facebook, Twitter, WeChat, BBC News, and Gmail, etc. However, this disclosure is not limited thereto, and the applications may be various existing applications or applications to be developed in the future.

In an embodiment, the operation on the content of the first application may include any one or more of the following: duplicating a part of the content of the first application, sharing a part of the content of the first application, transmitting a part of the content of the first application, and operating a part of the content of the first application; however, this disclosure is not limited thereto.

For example, the part of the content may include any one or more of the following forms: a word, a picture, a file, and program.

Figure 2:
FIG. 2 is a schematic diagram of operating a content of a first application of an embodiment of this disclosure.

FIG. 2 is a schematic diagram of operating the content of the first application of the embodiment of this disclosure. As shown in FIG. 2, the first application (such as BBC News) is opened and displayed on a display screen of the smart mobile phone, and the user may select a paragraph "he adopted a yoga pose-arching his back for air—until a neighbor 500 m away heard him shouting" therefrom, and perform a "share" operation on this paragraph of words.

Description is given in FIG. 2 taking sharing a paragraph of word as an example. However, this disclosure is not limited thereto; for example, a picture may be duplicated or shared, or a file may be transmitted, or an embedded program may be operated, etc., and a particular operation may be determined according to an actual situation.

In an embodiment, the mobile electronic equipment may display a list of one or more applications corresponding to the operation according to the operation. For example, all installed applications in the mobile electronic equipment capable of processing the sharing operation are shown in the list.

Figure 3:
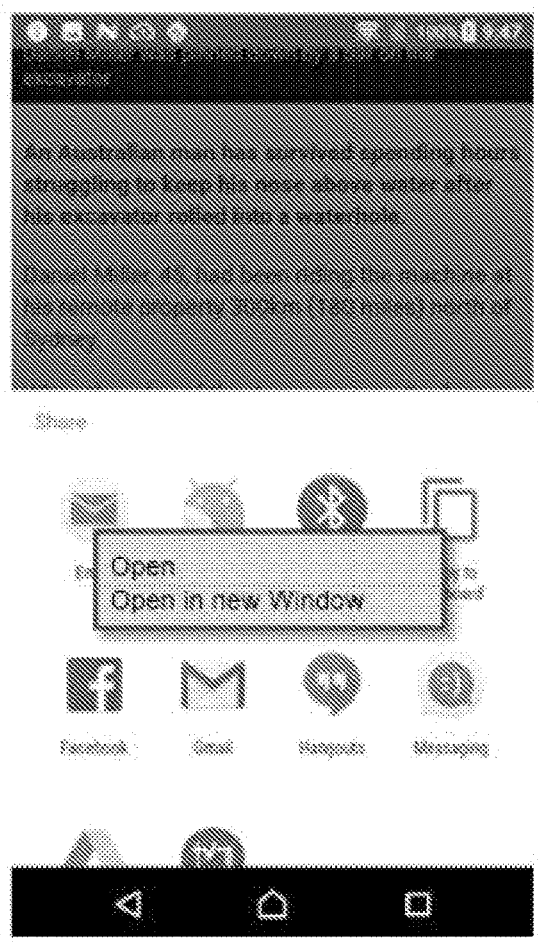
FIG. 3 is a schematic diagram of displaying an application list corresponding to the operation of an embodiment of this disclosure.

FIG. 3 is a schematic diagram of displaying the application list corresponding to the operation of the embodiment of this disclosure. As shown in FIG. 3, multiple applications in the mobile electronic equipment capable of processing an operation "word sharing" are listed, the applications including, for example, Email, Android Bean, Facebook and Gmail, . . . , etc.

The mobile electronic equipment may determine the second application from the one or more applications according to input of the user. For example, as shown in FIG. 3, the user selects an application "Email" as the second application, that is, the user expects to associate the paragraph of words shown in FIG. 2 and share it in the application "Email".

In an embodiment, the mobile electronic equipment may operate the second application in association with the operation. That is, it may determine that the second application is opened in a second window different from a first window operating the first application, and apply the operation to the second application associatedly, and the second application may make a response to the operation on the first application.

For example, on an interface shown in FIG. 3, the user may long click the application "Email", and two options, "open" and "open in new window", pop up for selection by the user. If the user selects "open", the application "Email" is opened in a single-window manner; and if the user selects "open in new window", the application "Email" is opened in a multi-window manner.

It should be appreciated that what described above is an example of determining an opening manner only. However, this disclosure is not limited thereto. For example, the user may short click the application "Email", and the application "Email" is opened in a single-window manner; and the user may long click the application "Email", and the application "Email" is opened in a multi-window manner.

In an embodiment, the applying the operation to the second application associatedly and making a response to the operation on the first application by the second application, may include:

duplicating a word or picture of the first application to a display region of the second application; or, sharing a word or picture of the first application to a editing region of the second application; or, transmitting a file of the first application to the display region of the second application; or, operating a program of the first application in an executing region of the second application; or, operating the second application based on a content of the first application.

However, this disclosure is not limited thereto; for example, other operations may be used.

Figure 4:
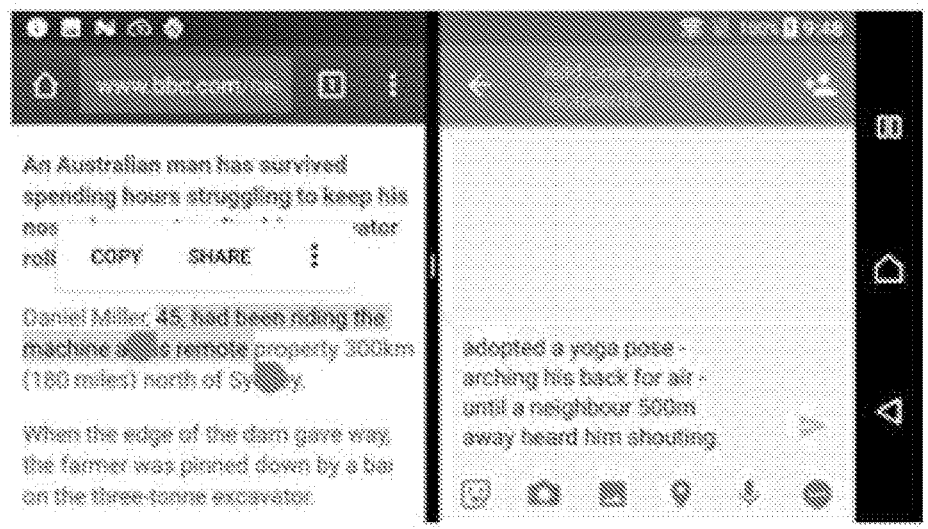
FIG. 4 is a schematic diagram of multi-window display of an embodiment of this disclosure.

FIG. 4 is a schematic diagram of multi-window display of the embodiment of this disclosure. As shown in FIG. 4, after the application "Email" is opened in a new window, the paragraph "he adopted a yoga pose-arching his back for air—until a neighbor 500 m away heard him shouting" has been shared in the application "Email" in association with the operation "word sharing" in the application "BBC News".

Thus, what is different from an existing multi-window displaying method is that the user may autonomously create a new window operating the second application, and open the second application in association with the operation on the first application, and the second application makes a response to the operation on the first application, which may reduce redundant operations on the second application, thereby improving experiences of users.

In an embodiment, the first application and the second application being displayed in a multi-window manner may include: the first application and second application being arranged (or may also be referred to as tiled) on the display screen of the mobile electronic equipment.

For example, as shown in FIG. 4, the two applications "BBC News" and "Email" are displayed side by side on the display screen of the mobile electronic equipment. As shown in FIG. 4, the user may proceed with selecting another paragraph of words "45, had been riding the machine at his remote" to operate (such as sharing). In the multi-window displaying method shown in FIG. 4, the sharing operation may be proceeded, without needing to switch applications.

In an embodiment, the first application and the second application being displayed in a multi-window manner may include: the first application and second application being stacked (or may also be referred to as overlapped) on a display screen of the mobile electronic equipment.

For example, the application "BBC News" may be stacked (or piled) over the application "Email", in which a part of the application "BBC News" and a part of the application "Email" are overlapped, and the two part-overlapped applications are displayed on the display screen of the mobile electronic equipment.

Hence, the user may autonomously create a new window operating the second application, and open the second application in association with the operation on the first application and perform multi-window display, with no need of frequent switching between multiple applications, thereby improving experiences of users.

Figure 5:
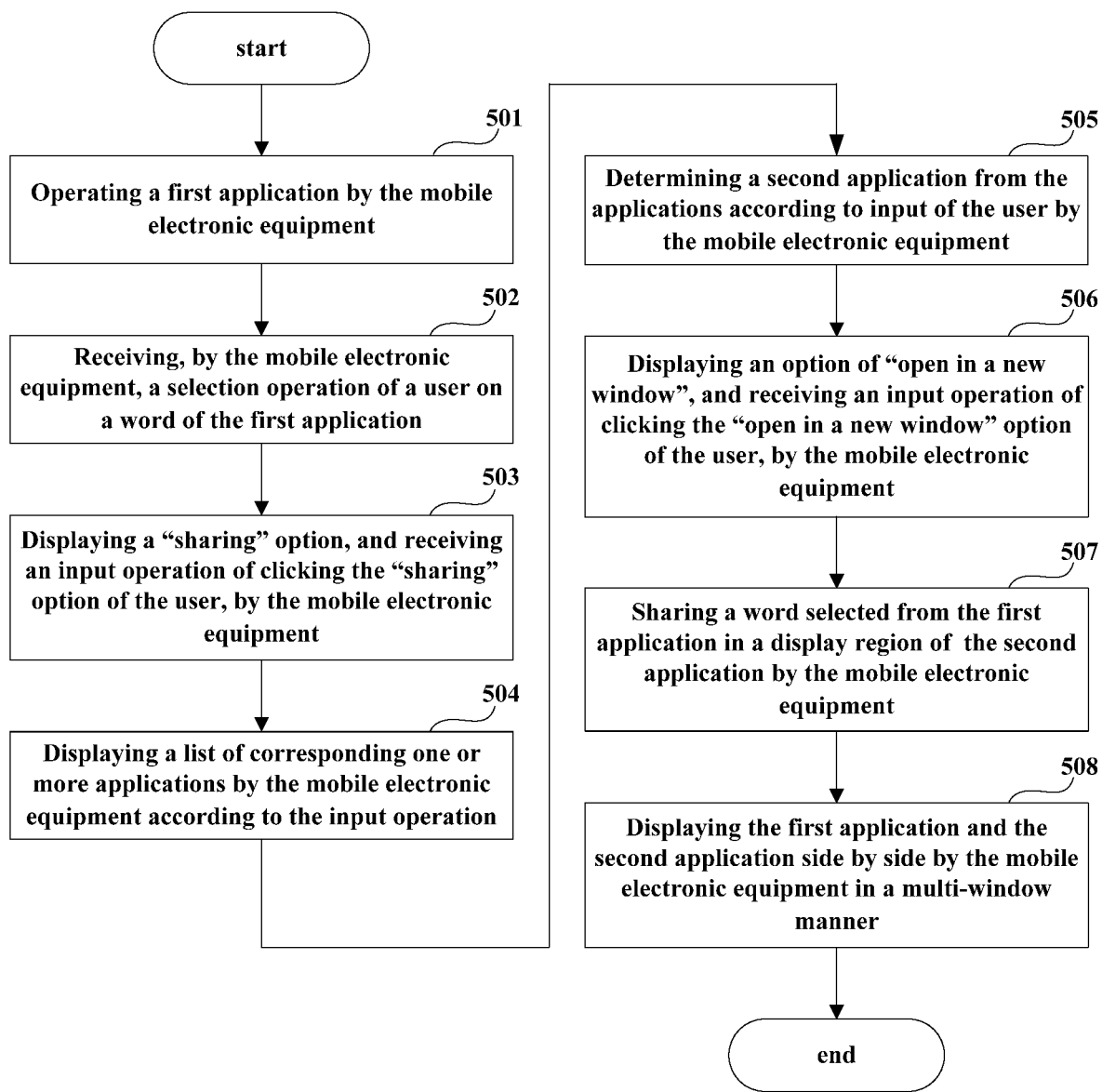
FIG. 5 is another flowchart of the multi-window displaying method of the embodiment of this disclosure.

FIG. 5 is another flowchart of the multi-window displaying method of the embodiment of this disclosure, in which the whole process is further described taking word sharing as an example. As shown in FIG. 5, the displaying method includes:

Step 501: operating the first application by the mobile electronic equipment;

Step 502: receiving, by the mobile electronic equipment, a selection operation of the user on a word of the first application;

Step 503: displaying a "sharing" option, and receiving an input operation of clicking the "sharing" option of the user, by the mobile electronic equipment;

Step 504: displaying a list of corresponding one or more applications by the mobile electronic equipment according to the input operation;

Step 505: determining a second application from the one or more applications according to input of the user by the mobile electronic equipment;

Step 506: displaying an option of "open in a new window", and receiving an input operation of clicking the "open in a new window" option of the user, by the mobile electronic equipment;

Step 507: sharing a word selected from the first application in a display region of the second application by the mobile electronic equipment; and Step 508: displaying the first application and the second application side by side by the mobile electronic equipment in a multi-window manner.

In the example shown in FIG. 5, as when the second application is opened, it makes a response to the sharing operation on the first application, the user is not needed to operate again (such as a paste operation), and as the first application and the second application are displayed in a multi-window manner, it is not needed to frequently switch between multiple applications.

It should be appreciated that the embodiment of this disclosure is only illustrated in FIG. 5. However, this disclosure is not limited thereto. For example, an order of executing these steps may be appropriately adjusted, and furthermore, some other steps may be added or some of these steps may be reduced. Also, appropriate modifications may be made by those skilled in the art according to the above contents, without being only limited to what is contained in FIG. 5.

In another example, the second application may be operated based on the operation on the first application.

For example, if the user selects a telephone number "123456789" from a first application (such as a Message APP) and performs a "dial" operation, the mobile electronic equipment will call a second application (such as a Telephone APP), and the second application will make a response to the "dial" operation. For example, the second application and the first application are displayed side by side in a multi-window manner, and when the second application is opened, it has started to perform dial operation on the telephone number "123456789".

It should be appreciated that the above description is given taking the "open" operation and the "dial" operation as examples. However, this disclosure is not limited thereto, and a particular operation may be determined according to an actual situation.

It can be seen from the above embodiment that after the mobile electronic equipment receives the operation on the content of the first application by a user, it may determine the second application from the one or more applications according to the input of the user, and operate the second application in association with the operation; wherein the second application makes a response to the operation on the first application, and the first application and the second application are displayed in a multi-window manner. Hence, the second application may associatedly be opened and multi-window display may be performed, with no need of frequent switching between multiple applications. Also, redundant operations on the second application may be reduced, thereby improving experiences of users.

Embodiment of the Second Aspect

An embodiment of this disclosure provides a multi-window displaying apparatus, which may be, for example, mobile electronic equipment, or one or more components or assemblies configured in the mobile electronic equipment. In this embodiment, contents identical to those in the embodiment of the first aspect shall not be described herein any further.

Figure 6:
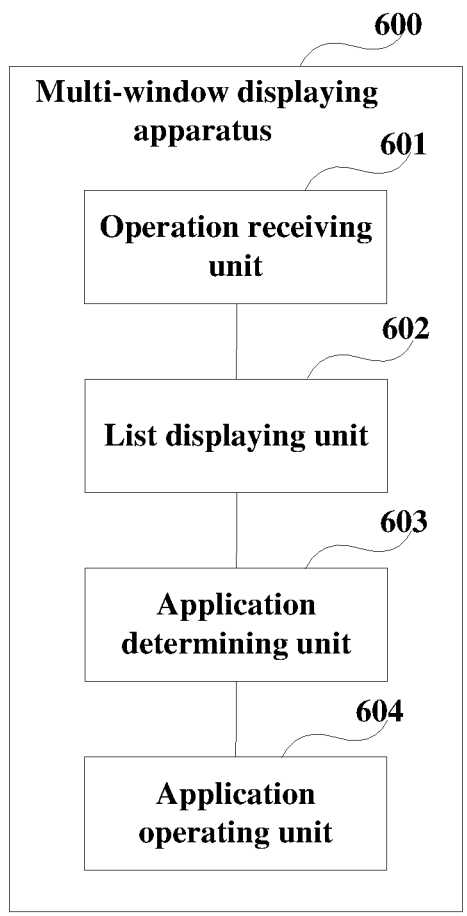
FIG. 6 is a schematic diagram of the multi-window displaying apparatus of an embodiment of this disclosure.

FIG. 6 is a schematic diagram of the multi-window displaying apparatus of the embodiment of this disclosure. As shown in FIG. 6, the multi-window displaying apparatus 600 includes:

an operation receiving unit 601 configured to receive an operation on a content of a first application by a user;

a list displaying unit 602 configured to display a list of one or more applications corresponding to the operation according to the operation;

an application determining unit 603 configured to determine a second application from the one or more applications according to input of the user; and an application operating unit 604 configured to operate the second application in association with the operation; wherein the second application makes a response to the operation on the first application, and the first application and the second application are displayed in a multi-window manner.

In an embodiment, the operation on the content of the first application may include any one or more of the following: duplicating a part of the content of the first application, sharing a part of the content of the first application, transmitting a part of the content of the first application, and operating a part of the content of the first application. However, this disclosure is not limited thereto.

For example, the part of the content may include any one or more of the following forms: a word, a picture, a file, and program.

In an embodiment, the operating the second application in association with the operation may include: determining that the second application is opened in a second window different from a first window of the first application; and applying the operation to the second application associatedly and making a response to the operation on the first application by the second application.

For example, the applying the operation to the second application associatedly and making a response to the operation on the first application by the second application, may include: duplicating a word or picture of the first application to a display region of the second application; or, sharing a word or picture of the first application to a editing region of the second application; or, transmitting a file of the first application to the display region of the second application; or, operating a program of the first application in an executing region of the second application; or, operating the second application based on a content of the first application. However, this disclosure is not limited thereto.

In an embodiment, the first application and the second application being displayed in a multi-window manner may include: the first application and second application being arranged on a display screen of the mobile electronic equipment; or, the first application and second application being stacked on a display screen of the mobile electronic equipment. However, this disclosure is not limited thereto.

It should be appreciated that the components and modules related to this disclosure are only described above. However, this disclosure is not limited thereto, and the multi-window displaying apparatus 600 may further include other components and modules, and the relevant art may be referred to for particular contents of these components and modules.

It can be seen from the above embodiment that after the mobile electronic equipment receives the operation on the content of the first application by a user, it may determine the second application from the one or more applications according to the input of the user, and operate the second application in association with the operation; wherein the second application makes a response to the operation on the first application, and the first application and the second application are displayed in a multi-window manner. Hence, the second application may associatedly be opened and multi-window display may be performed, with no need of frequent switching between multiple applications. Also, redundant operations on the second application may be reduced, thereby improving experiences of users.

Embodiment of the Third Aspect

An embodiment of this disclosure provides mobile electronic equipment, which may be a mobile phone, a tablet PC, a portable digital camera, a media player, a portable game device, a PDA, a computer, or the like, and this embodiment is not limited thereto.

In this embodiment, the mobile electronic equipment may be a smart mobile phone; however, this disclosure is not limited thereto.

Figure 7:
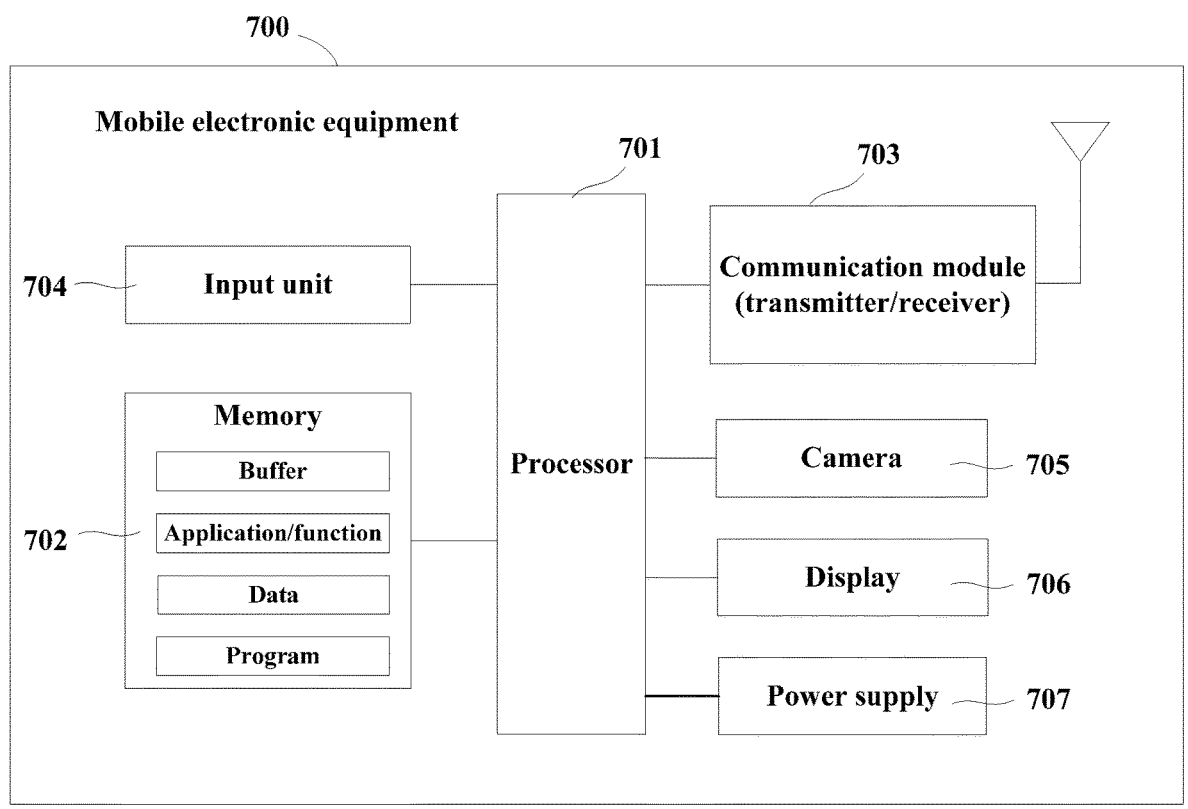
FIG. 7 is a schematic diagram of a systematic structure of mobile electronic equipment of an embodiment of this disclosure.

FIG. 7 is a block diagram of a system diagram or structure of the mobile electronic equipment of an embodiment of this disclosure. As shown in FIG. 7, the mobile electronic equipment 700 may include a processor 701 and a memory 702, the memory 702 being coupled to the processor 701 and storing instructions executed by the processor 701. It should be appreciated that this figure is illustrative only, and other types of structures may also be used, so as to supplement or replace this structure and achieve a telecommunications function or other functions.

In an implementation, the functions of the multi-window displaying apparatus 600 may be integrated into the processor 701. The processor 701 may be configured to perform the following control by executing the instructions: receiving an operation on a content of a first application by a user; displaying a list of one or more applications corresponding to the operation according to the operation; determining a second application from the one or more applications according to input of the user; and operating the second application in association with the operation; wherein the second application makes a response to the operation on the first application, and the first application and the second application are displayed in a multi-window manner.

In an embodiment, the operation on the content of the first application includes any one or more of the following: duplicating a part of the content of the first application, sharing a part of the content of the first application, transmitting a part of the content of the first application, and operating a part of the content of the first application.

In an embodiment, the part of the content includes any one or more of the following forms: a word, a picture, a file, and program.

In an embodiment, the processor 701 may be configured to perform following control by executing the instructions: determining that the second application is opened in a second window different from a first window of the first application; and applying the operation to the second application associatedly and making a response to the operation on the first application by the second application.

In an embodiment, the processor 701 may be configured to perform the following control by executing the instructions: duplicating a word or picture of the first application to a display region of the second application; or, sharing a word or picture of the first application to an editing region of the second application; or, transmitting a file of the first application to the display region of the second application; or, operating a program of the first application in an executing region of the second application; or, operating the second application based on a content of the first application.

In an embodiment, the first application and the second application being displayed in a multi-window manner includes: the first application and second application being arranged on a display screen of the mobile electronic equipment; or, the first application and second application being stacked on a display screen of the mobile electronic equipment.

In another implementation, the multi-window displaying apparatus 600 and the processor 701 may be configured separately. For example, the multi-window displaying apparatus 600 may be configured as a chip connected to the processor 701, with its functions being realized under control of the processor 701.

As shown in FIG. 7, the mobile electronic equipment 700 may further include a communication module 703, an input unit 704, a camera 705, a display 706 and a power supply 707.

As shown in FIG. 7, the processor 701 (sometimes referred to as a controller or control unit, which may include a microprocessor or other processor devices and/or logic devices) receives input and controls operations of every components of the mobile electronic equipment 700. The input unit 704 provides input to the processor 701. The input unit 704 is, for example, a button or a touch input device. The camera 705 is configured to capture image data, and provide the captured image data to the processor 701 for use in a conventional manner, such as storage, and transmission, etc.

The power supply 707 is configured to supply power to the mobile electronic equipment 700. The display 706 is configured to display objects to be displayed, such as images, and words, etc. The display may be, for example, an LCD display or an LED display; however, this disclosure is not limited thereto.

The memory 702 may be a solid state memory, such as a read-only memory (ROM), a random access memory (RAM), and a SIM card, etc. It may also be such a memory that may store information when power is off, may be selectively erased, and may be provided with more data, and an example of such a memory is sometimes referred to as an EPROM, etc. The memory 702 may also be another type of device. The memory 702 may include a buffer memory (sometimes referred to as a buffer). The memory 702 may include an application/function storage portion configured to store applications and function programs or procedures executing operations of the mobile electronic equipment 700 via the processor 701. For example, the memory 702 may include a non-transitory memory or a portion that is non-transitory.

The memory 702 may further include a data storage portion configured to store data, such as a contact, digital data, a picture, a voice and/or any other data used by the mobile electronic equipment 700. A driver storage portion of the memory 702 includes various drivers of the mobile electronic equipment 700 for communication functions and/or for executing other functions (such as message transmission application, and directory application, etc.) of the mobile electronic equipment 700.

The communication module 703 is a transmitter/receiver transmitting and receiving signals via antennas. The communication module (transmitter/receiver) 703 is coupled to the processor 701 to provide input signals and receive output signals, which may be identical to a case in a conventional communication terminal. Based on different communication technologies, in the same electronic equipment, multiple communication modules 703, such as a cellular network module, a Bluetooth module and/or a WLAN module, etc., may be provided, so as to achieve general telecommunications functions.

It should be appreciated that FIG. 7 only illustrates a part of the structure of the mobile electronic equipment 700. The mobile electronic equipment 700 does not necessarily include all the components shown in FIG. 7. And furthermore, the mobile electronic equipment 700 may include components not shown in FIG. 7, and the relevant art may be referred to.

An embodiment of the present disclosure provides a computer readable program code, which, when executed in mobile electronic equipment, will cause the mobile electronic equipment to carry out the multi-window displaying method as described in the first aspect of Embodiment.

An embodiment of the present disclosure provides a computer readable medium, including a computer readable program code, which will cause mobile electronic equipment to carry out the multi-window displaying method as described in the first aspect of Embodiment.

The preferred embodiments of the present disclosure are described above with reference to the drawings. The many features and advantages of the embodiments are apparent from the detailed specification and, thus, it is intended by the appended claims to cover all such features and advantages of the embodiments that fall within the true spirit and scope thereof. Further, since numerous modifications and changes will readily occur to those skilled in the art, it is not desired to limit the inventive embodiments to the exact construction and operation illustrated and described, and accordingly all suitable modifications and equivalents may be resorted to, falling within the scope thereof.

It should be understood that each of the parts of the present disclosure may be implemented by hardware, software, firmware, or a combination thereof. In the above embodiments, multiple steps or methods may be realized by software or firmware that is stored in the memory and executed by an appropriate instruction executing system. For example, if it is realized by hardware, it may be realized by any one of the following technologies known in the art or a combination thereof as in another embodiment: a discrete logic circuit having a logic gate circuit for realizing logic functions of data signals, application-specific integrated circuit having an appropriate combined logic gate circuit, a programmable gate array (PGA), and a field programmable gate array (FPGA), etc.

The description or blocks in the flowcharts or of any process or method in other manners may be understood as being indicative of including one or more modules, segments or parts for realizing the codes of executable instructions of the steps in specific logic functions or processes, and that the scope of the preferred embodiments of the present disclosure include other implementations, wherein the functions may be executed in manners different from those shown or discussed, including executing the functions according to the related functions in a substantially simultaneous manner or in a reverse order, which should be understood by those skilled in the art to which the present disclosure pertains.

The logic and/or steps shown in the flowcharts or described in other manners here may be, for example, understood as a sequencing list of executable instructions for realizing logic functions, which may be implemented in any computer readable medium, for use by an instruction executing system, device or apparatus (such as a system including a computer, a system including a processor, or other systems capable of extracting instructions from an instruction executing system, device or apparatus and executing the instructions), or for use in combination with the instruction executing system, device or apparatus.

The above literal description and drawings show various features of the present disclosure. It should be understood that a person of ordinary skill in the art may prepare suitable computer code to carry out each of the steps and processes described above and illustrated in the drawings. It should also be understood that the above-described terminals, computers, servers, and networks, etc. may be any type, and the computer code may be prepared according to the disclosure contained herein to carry out the present disclosure by using the devices.

Particular embodiments of the present disclosure have been disclosed herein. Those skilled in the art will readily recognize that the present disclosure is applicable in other environments. In practice, there exist many embodiments and implementations. The appended claims are by no means intended to limit the scope of the present disclosure to the above particular embodiments. Furthermore, any reference to "a device to . . . " is an explanation of device plus function for describing elements and claims, and it is not desired that any element using no reference to "a device to . . . " is understood as an element of device plus function, even though the wording of "device" is included in that claim.

Although a particular preferred embodiment or embodiments have been shown and the present disclosure has been described, it is evident that equivalent modifications and variants are conceivable to those skilled in the art in reading and understanding the description and drawings. Especially for various functions executed by the above elements (portions, assemblies, apparatus, and compositions, etc.), except otherwise specified, it is desirable that the terms (including the reference to "device") describing these elements correspond to any element executing particular functions of these elements (i.e. functional equivalents), even though the element is different from that executing the function of an exemplary embodiment or embodiments illustrated in the present disclosure with respect to structure. Furthermore, although the particular feature of the present disclosure is described with respect to only one or more of the illustrated embodiments, such a feature may be combined with one or more other features of other embodiments as desired and in consideration of advantageous aspects of any given or particular application.

The invention claimed is:

1. A method of displaying multi-windows on a mobile phone having a display, the displaying method comprising:
    displaying on the display a first application including content;
    receiving an operation from a user on the content of the first application;
    displaying on the display a list of one or more applications corresponding to the received operation;
    receiving from the user a selection of a second application from the one or more applications;
    providing a part of the content to the second application based on the received operation on the content of the first application;
    in response to the selection of the second application, displaying on the display the second application including the part of the content in a multi-window manner with the first application, the first application and the second application being arranged next to one another, such that:
        both the first application and the second application are visible and positioned on the display to receive further input from the user;
        the first application remains visible when the second application is brought to a foreground of the display; and
        the second application remains visible when the first application is brought to the foreground of the display;
    receiving a selection operation from the user on the content of the first application, the selection operation identifying selected content;
    displaying a list of operations concerning the selected content including a share operation; and
    when the user selects the share operation, providing the selected content to the second application.

2. The displaying method according to claim 1, wherein the providing of the part of the content comprises any one or more of the following: duplicating a part of the content of the first application, sharing a part of the content of the first application, transmitting a part of the content of the first application, and operating a part of the content of the first application.

3. The displaying method according to claim 2, wherein the part of the content comprises any one or more of the following forms: a word, a picture, a file, and a program.

4. The displaying method according to claim 1, wherein the displaying of the second application including the part of the content comprises:
    opening the second application in a second window different from a first window of the first application; and
    displaying the part of the content in the second window.

5. The displaying method according to claim 4, wherein the displaying of the part of the content in the second window comprises at least one of:
    duplicating a word or picture of the first application to a display region of the second application;
    sharing a word or picture of the first application to an editing region of the second application;
    transmitting a file of the first application to the display region of the second application;

operating a program of the first application in an executing region of the second application; or operating the second application based on a content of the first application.

6. The method of claim 1, wherein the first application is arranged to cover a first portion of the display and the second application is arranged to cover a remainder of the display.

7. A mobile phone comprising:

a touch input display configured to:
 display a first application including content;
 receive an operation from a user on the content of the first application;
 display a list of one or more applications corresponding to the received operation;
 receive from the user a selection of a second application from the one or more applications;

a processor configured to:
 provide a part of the content to the second application based on the received operation on the content of the first application;
 in response to the selection of the second application, display on the display the second application including the part of the content in a multi-window manner with the first application, the first application and the second application being arranged next to one another, such that:
  both the first application and the second application are visible and positioned on the display to receive further input from the user;
  the first application remains visible when the second application is brought to a foreground of the display; and
  the second application remains visible when the first application is brought to the foreground of the display;
 receive a selection operation from the user on the content of the first application, the selection operation identifying selected content;
 display a list of operations concerning the selected content including a share operation; and
 receive a share operation from the user; and
 when the user selects the share operation, provide the selected content to the second application.

8. The mobile phone of claim 7, wherein the first application is arranged to cover a first portion of the display and the second application is arranged to cover a remainder of the display.

9. A mobile phone, comprising a memory, a display, and a processor, the memory storing instructions executed by the processor, and the processor being configured to perform following control by executing the instructions:

displaying on the display a first application including content;
receiving an operation from a user on the content of the first application;
displaying on the display a list of one or more applications corresponding to the received operation;
receiving from the user a selection of a second application from the one or more applications;
providing a part of the content to the second application based on the received operation on the content of the first application; and
in response to the selection of the second application, displaying on the display the second application including the part of the content in a multi-window manner with the first application, the first application and the second application being arranged next to one another, such that:
 both the first application and the second application are visible and positioned to receive further input from the user;
 the first application remains visible when the second application is brought to a foreground of the display; and
 the second application remains visible when the first application is brought to the foreground of the display;
receiving a selection operation from the user on the content of the first application, the selection operation identifying selected content;
displaying a list of operations concerning the selected content including a share operation; and
when the user selects the share operation, providing the selected content to the second application.

10. The mobile phone according to claim 9, wherein the providing of the part of the content comprises any one or more of the following:

duplicating a part of the content of the first application, sharing a part of the content of the first application, transmitting a part of the content of the first application, and operating a part of the content of the first application.

11. The mobile phone according to claim 10, wherein the part of the content comprises any one or more of the following forms: a word, a picture, a file, and a program.

12. The mobile phone according to claim 9, wherein the processor is configured to perform the following control by executing the instructions:

opening the second application in a second window different from a first window of the first application; and
displaying the part of the content in the second window.

13. The mobile phone according to claim 9, wherein the displaying of the part of the content in the second window comprises at least one of:

duplicating a word or picture of the first application to a display region of the second application;
sharing a word or picture of the first application to an editing region of the second application;
transmitting a file of the first application to the display region of the second application;
operating a program of the first application in an executing region of the second application; or
operating the second application based on a content of the first application.

14. The mobile phone of claim 9, wherein the first application is arranged to cover a first portion of the display and the second application is arranged to cover a remainder of the display.

* * * * *